US009836127B2

(12) United States Patent
Jung

(10) Patent No.: US 9,836,127 B2
(45) Date of Patent: Dec. 5, 2017

(54) APPARATUS AND METHOD FOR INPUTTING COMMAND USING GESTURE

(75) Inventor: Woo Kil Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 75 days.

(21) Appl. No.: 14/000,699

(22) PCT Filed: Apr. 22, 2011

(86) PCT No.: PCT/KR2011/002943
§ 371 (c)(1),
(2), (4) Date: Aug. 21, 2013

(87) PCT Pub. No.: WO2012/115307
PCT Pub. Date: Aug. 30, 2012

(65) Prior Publication Data
US 2013/0328769 A1    Dec. 12, 2013

(30) Foreign Application Priority Data
Feb. 23, 2011 (KR) .................. 10-2011-0016219

(51) Int. Cl.
G06F 3/01    (2006.01)
G06F 3/03    (2006.01)
G06F 3/042    (2006.01)

(52) U.S. Cl.
CPC .......... *G06F 3/017* (2013.01); *G06F 3/0304* (2013.01); *G06F 3/0425* (2013.01)

(58) Field of Classification Search
CPC ........ G06F 3/005; G06F 3/017; G06F 3/0488; G06F 3/04883; G06F 3/04886; G06F 3/0304; G06K 9/00335

USPC .......................................... 345/156; 715/863
See application file for complete search history.

(56) References Cited

U.S. PATENT DOCUMENTS

| 5,594,469 | A | 1/1997 | Freeman et al. | |
|---|---|---|---|---|
| 6,842,175 | B1 * | 1/2005 | Schmalstieg et al. | ........ 345/427 |
| 8,018,579 | B1 * | 9/2011 | Krah | ..................... G01B 11/00 356/4.01 |
| 8,174,496 | B2 * | 5/2012 | Sagong | ................. G06F 1/1626 345/156 |
| 2003/0132913 | A1 * | 7/2003 | Issinski | ................. G06F 3/0428 345/158 |
| 2003/0132950 | A1 | 7/2003 | Surucu et al. | |
| 2004/0193413 | A1 | 9/2004 | Wilson et al. | |
| 2009/0031240 | A1 | 1/2009 | Hildreth | |
| 2009/0153476 | A1 * | 6/2009 | Kang | ............................ 345/157 |
| 2010/0287486 | A1 * | 11/2010 | Coddington | .......... G06F 3/0236 715/769 |
| 2011/0063224 | A1 * | 3/2011 | Vexo et al. | ................... 345/168 |

(Continued)

OTHER PUBLICATIONS

International Search Report in International Application No. PCT/KR2011/002943, filed Apr. 22, 2011.

*Primary Examiner* — Stephen Sherman
(74) *Attorney, Agent, or Firm* — Saliwanchik, Lloyd & Eisenschenk

(57) ABSTRACT

Disclosure is a method of inputting commands into displays such as TVs or image processing devices. User's hands have been photographed through a camera to recognize the motion of the user's hands, so that commands are input according to the motion of user's hands instead of conventional input devices such as a mouse and a keyboard.

17 Claims, 6 Drawing Sheets

(56) References Cited

U.S. PATENT DOCUMENTS

2011/0102570 A1* 5/2011 Wilf .................. G06F 3/017
  348/77
2011/0298827 A1* 12/2011 Perez ................ G06K 9/00355
  345/647

* cited by examiner

[Fig. 1]
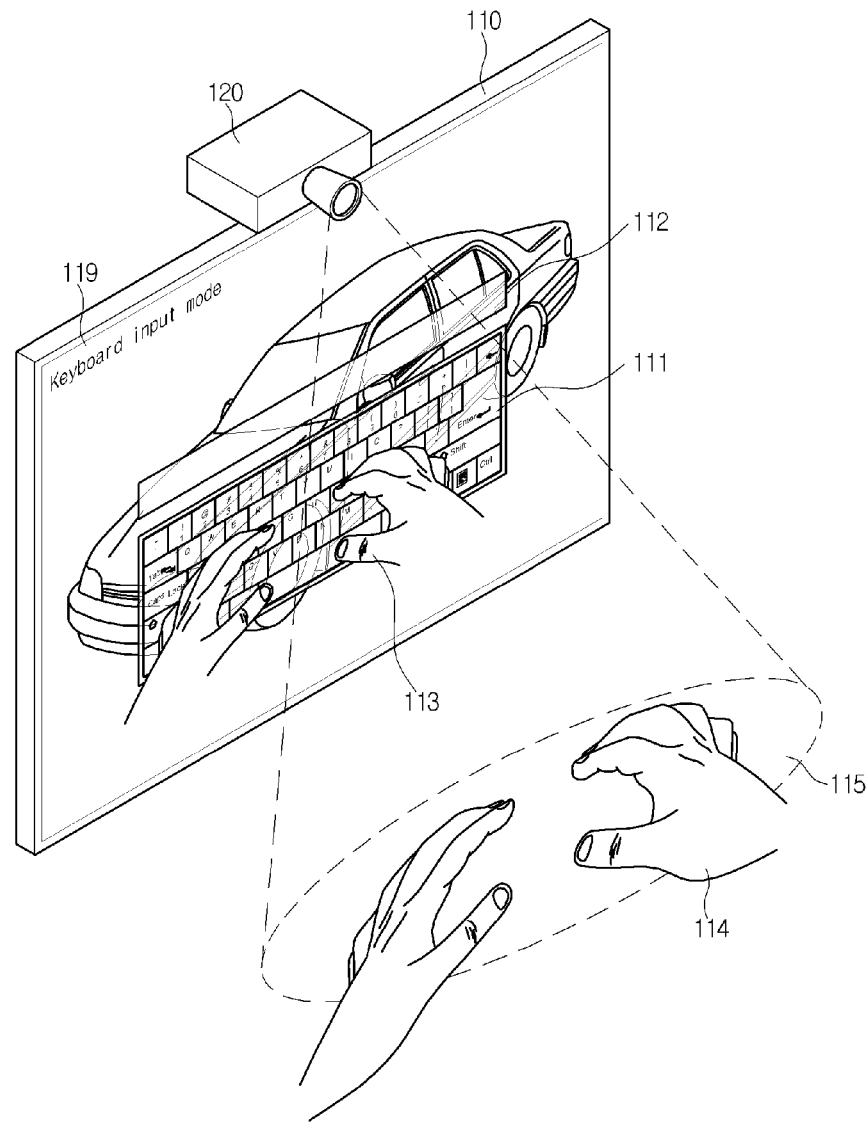
[Fig. 2]
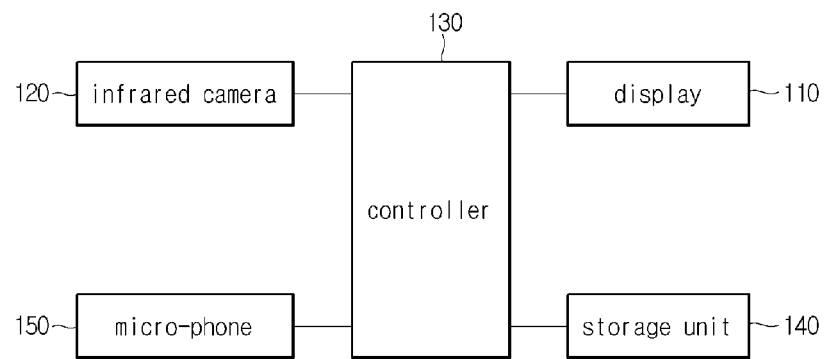

[Fig. 3]
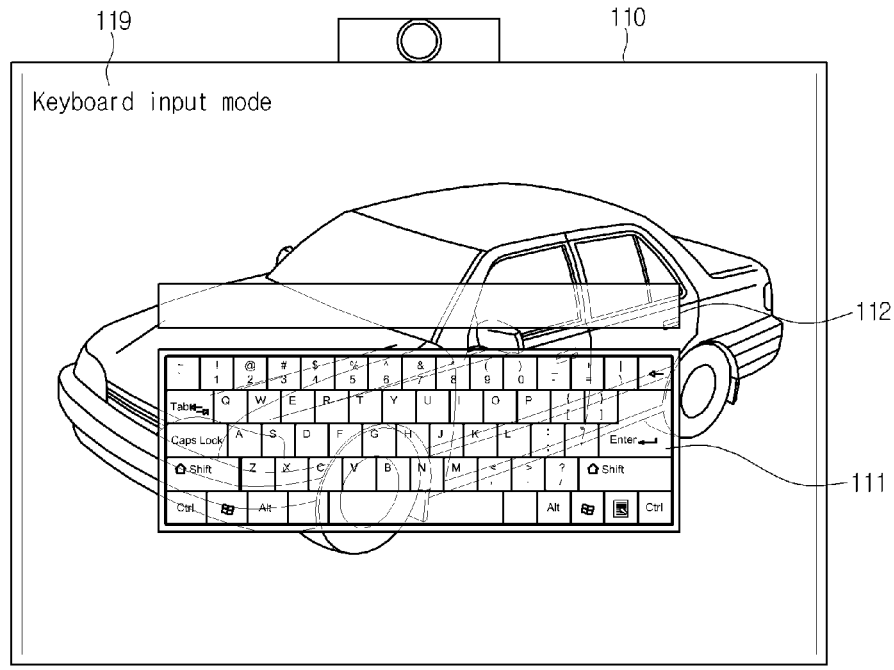
[Fig. 4]
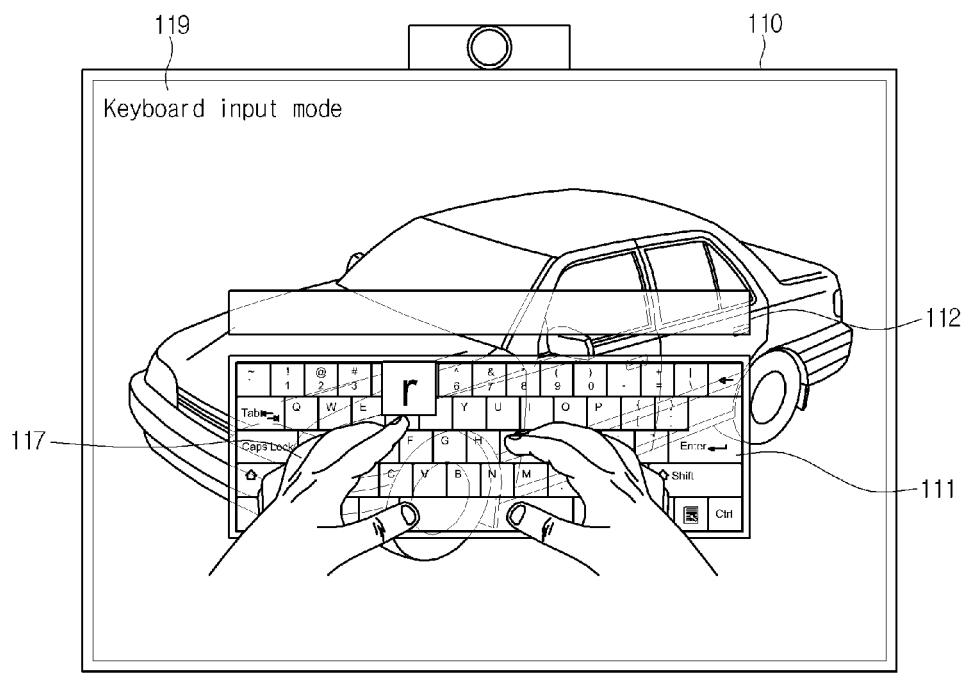

[Fig. 5]
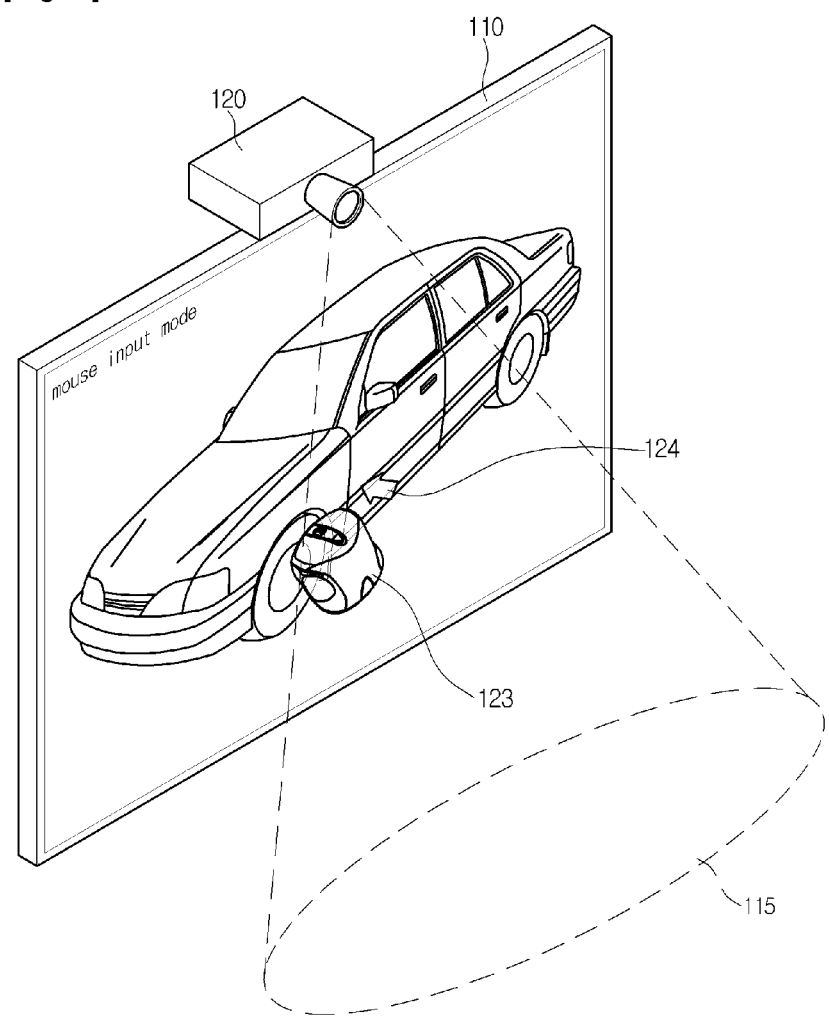

[Fig. 6]
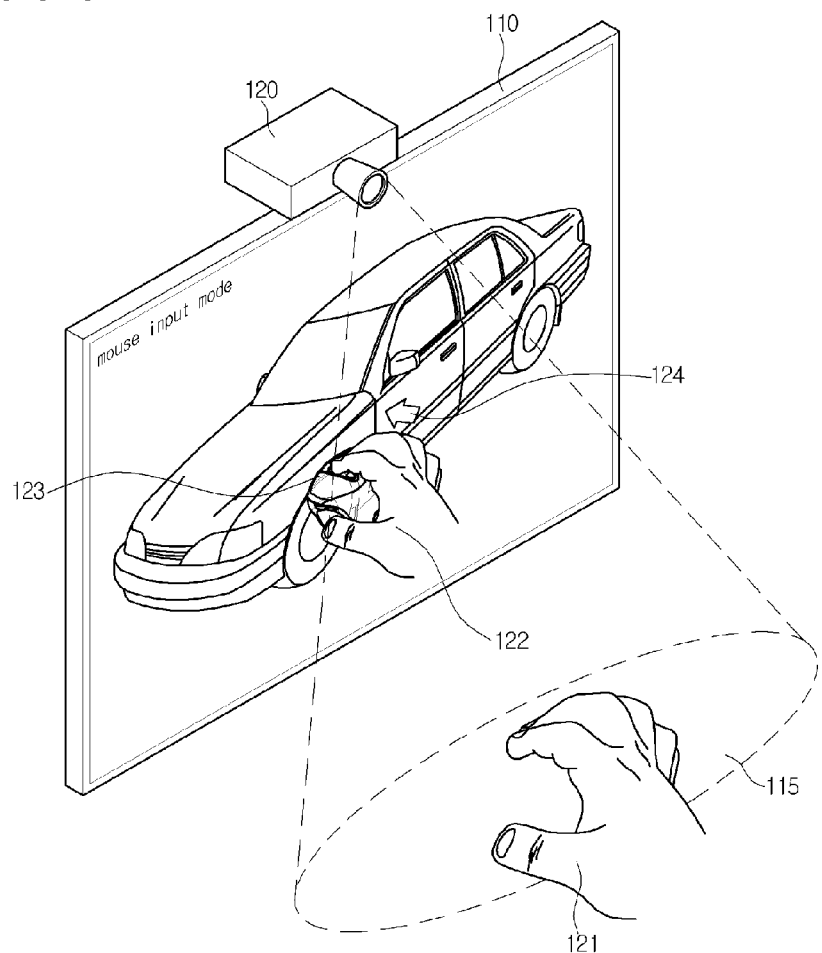
[Fig. 7]
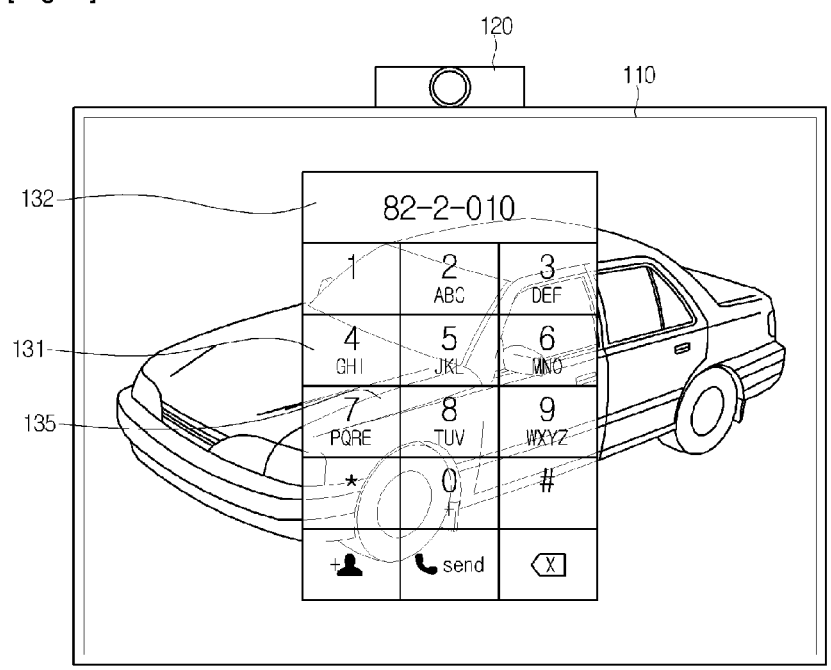

[Fig. 8]
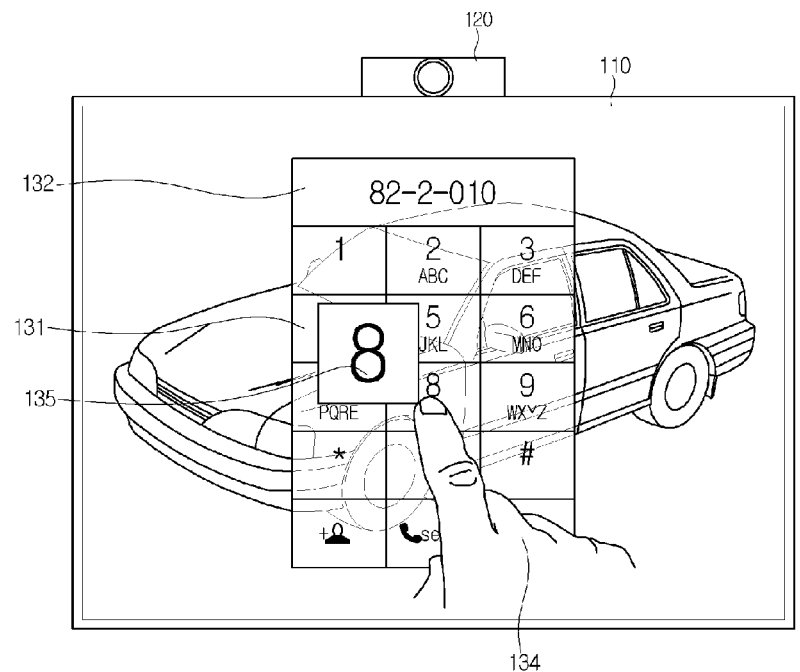
[Fig. 9]
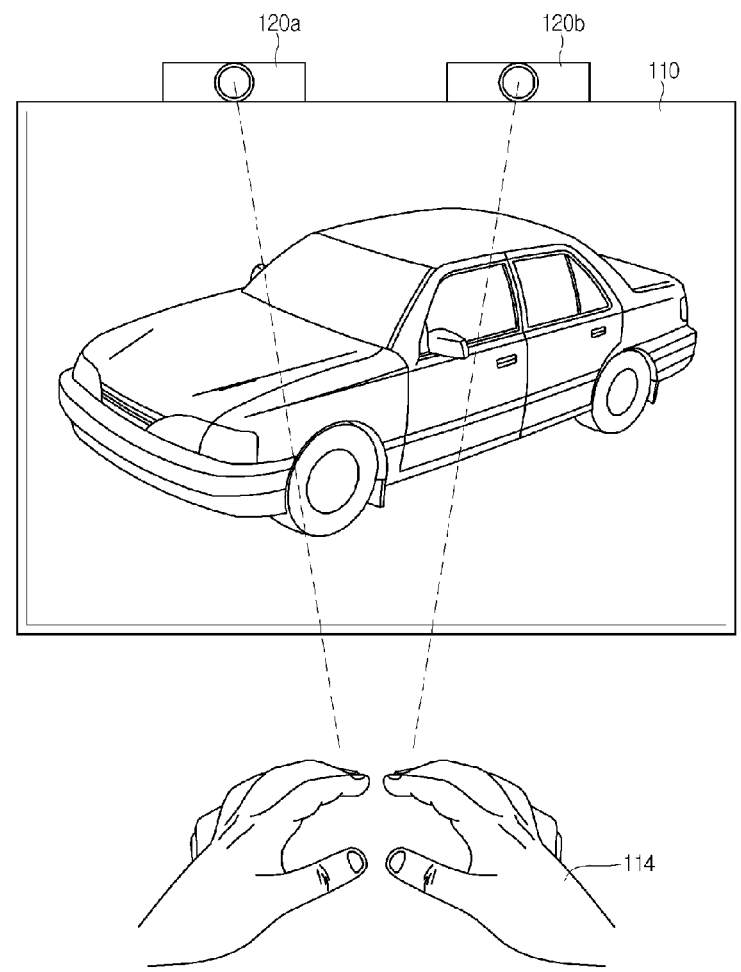

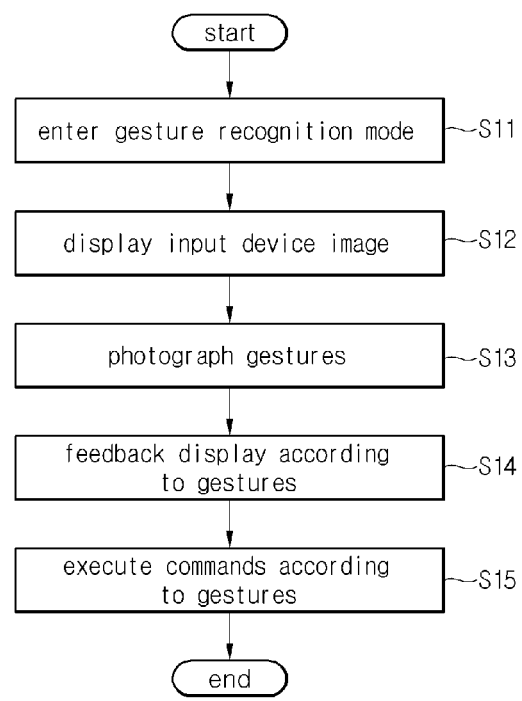
[Fig. 10]

APPARATUS AND METHOD FOR INPUTTING COMMAND USING GESTURE

CROSS-REFERENCE TO RELATED APPLICATIONS

This application is the U.S. national stage application of International Patent Application No. PCT/KR2011/002943, filed Apr. 22, 2011, which claims priority to Korean Application No. 10-2011-0016219, filed Feb. 23, 2011, the disclosures of each of which are incorporated herein by reference in their entirety.

TECHNICAL FIELD

The disclosure relates to an apparatus and a method for inputting commands using gestures of a user. More particularly the disclosure relates to a method of inputting commands into displays such as TVs or image processing devices, in which user's hands have been photographed through a camera to recognize the motion of the user's hands, so that commands are input according to the motion of user's hands instead of conventional input devices such as a mouse and a keyboard.

BACKGROUND ART

Recently, a new apparatus and method of inputting commands are required in a display or an image processing apparatus capable of performing multiple functions of a smart TV because it is difficult for a user to input various commands by using a conventional simple remote controller.

A keyboard or mouse, which is a conventional input device, may be inconvenient when a user uses the keyboard or the mouse in a living room where a TV is mainly installed. In addition, wired devices such as USB cables may be restricted in distance or annoy the user.

DISCLOSURE OF INVENTION

Technical Problem

The disclosure has been made to solve the problems occurring in the related art, and an object of the disclosure is to provide a novel method of inputting commands for a display or an image processing apparatus, capable of performing multiple functions of a smart TV.

Another object of the disclosure is to provide a method of easily inputting commands using gestures by a user in wireless.

Solution to Problem

According to one embodiment, an input apparatus using a gesture includes at least one camera photographing a gesture of a user, a controller displaying a virtual image of a device to which the gesture is applied, a user gesture image that has been photographed, and a feedback image according to the user gesture in a gesture recognition mode, and executing a command according to the user gesture, and a storage unit storing a command code used to run an operation of the controller.

According to one embodiment, an input method using a gesture of a user includes photographing the gesture of the user, displaying a virtual image of a device to which the gesture is applied in a gesture recognition mode, displaying a photographed image of the gesture of the user, displaying a feedback image according to the gesture of the user, and executing a command according to the gesture of the user.

Advantageous Effects of Invention

According to the disclosure, in the display or the image processing apparatus capable of performing multiple functions, a user can easily input commands using gestures.

According to the disclosure, a user provides images for user's own hands, a virtual keyboard, or a virtual mouse to a screen through a feedback scheme, so that the user can more exactly input desired commands.

In addition, according to the disclosure, the recognition rate can be improved by recognizing the depth of gestures through a plurality of cameras.

BRIEF DESCRIPTION OF DRAWINGS

FIG. 1 is a view showing a method in which a virtual keyboard is typed using a user's gesture according to one embodiment of the disclosure;

FIG. 2 is a block diagram showing the structure of an input device using a gesture according to one embodiment of the disclosure;

FIGS. 3 and 4 are views showing that a user types the virtual keyboard using a user gesture according to one embodiment of the disclosure;

FIGS. 5 and 6 are views showing a method of performing mouse input by using the input device according to one embodiment of the disclosure;

FIGS. 7 and 8 are views showing a method of inputting phone numbers using the gesture of the user according to one embodiment of the disclosure;

FIG. 9 is a view showing a method of recognizing a gesture by using a plurality of cameras according to one embodiment of the disclosure; and FIG. 10 is a flowchart showing an input method using a gesture according to one embodiment of the disclosure.

BEST MODE FOR CARRYING OUT THE INVENTION

Hereinafter, the embodiments according to the disclosure will be described in more detail with reference to accompanying drawings.

FIG. 1 is a view showing a method in which a virtual keyboard is typed using a user's gesture according to one embodiment of the disclosure.

An infrared camera 120 is installed at one side of a display 110 to photograph an image of an object introduced into a predetermined detection region 115 near the display 110.

If the display 110 is set in a gesture recognition mode, an image 111 of a virtual input device, for example, a virtual keyboard is displayed on the screen of the display 110. An input window image 112 may be displayed on the key board image 111 to display values input through the virtual keyboard. The virtual keyboard image 111 and the input window image 112 may be displayed as semi-transparent images. Although the virtual keyboard image 111 and the input window image 112 are displayed, contents, such as a film, a drama, and an Internet browsing image, which are being displayed on the display 110, are visible by a user.

If a user puts hands into the detection region 115, the infrared camera 120 photographs the user's hands, so that a hand image 113 of the user can be displayed on the screen of the display 110.

The hand image 113 of the user may be displayed as a semi-transparent image. In this state, if the user makes a gesture of typing a keyboard in the air, appropriate characters may be input.

Since the infrared camera 120 is used, the input using the gesture can be performed without light around the infrared camera 120.

FIG. 2 is a block diagram showing the structure of an input device 10 using a gesture according to one embodiment of the disclosure.

As shown in FIG. 2, the input device 10 according to one embodiment of the disclosure includes the infrared camera 120 to photograph a user gesture, a controller 130 to display a virtual image of a device to which the user gesture is applied, a user gesture image that has been photographed, and a feedback image according to the user gesture in a gesture recognition mode, and execute a command according to the user gesture, a storage unit 140 to store command codes used to execute the operation of the controller 130, a micro-phone 150 to receive the voice of the user, and a display 110 to display the virtual image of the device, the user gesture image, and the feedback image.

The infrared camera 120, which is an external camera, is detachably coupled with the input device 10. The infrared camera 120 is provided therein with an infrared lighting unit. According to another embodiment, a visible light camera may be used.

The display 110 may include an LCD or a PDP. The display 110 may be integrated with the input device 10. The display 110 is an external display, and may be detachably coupled with to the input device 10.

The controller 130 can operate according to the software stored in the storage unit 140. The controller 130 runs all operations of the input device 10. The controller 130 may be realized through ASIC or FPGA. In addition, the controller 130 may be realized as an embedded system to run only the operation of the input device 10, or may be a general purpose process to run different operations according to the software stored in the storage unit 140.

The storage unit 140 stores the software to operate the controller 130. In addition, the storage unit 140 can store user data such as films, photographs, and music.

The micro-phone 150 receives the voice of the user. As described below, a user may activate the gesture recognition mode of the input device 10 through the voice input, or may change the gesture recognition mode.

Mode for the Invention

FIGS. 3 and 4 are views showing that a user types the virtual keyboard using a user gesture according to one embodiment of the disclosure. FIG. 3 is a view showing the screen image of the display 110 shown in FIG. 1.

A user can execute a keyboard input mode through voice input or a remote controller. For example, if the user speaks "Keyboard Input" the voice of the user is input through the micro-phone 150, and the controller 130 recognizes a command through voice processing to perform the keyboard input mode. If the keyboard input mode is executed, the input window 112, on which the keyboard virtual image 111 and input values are displayed, may be displayed on the display 110 as shown in FIG. 3. The keyboard virtual image 111 and the input window 112 may be displayed as a semi-transparent image. In addition, an indicator 119 may be displayed at one side of the screen image to represent that a present mode is the keyboard input mode.

If the user puts the hands into the detection region 115, the hand image 113 may be displayed on the screen image as shown in FIG. 4. The hand image 113 may be displayed as a semi-transparent image. If the user moves user's fingers, the fingers of the hand image 113 moves. Accordingly, the user can visually recognize the position of the fingers on the keyboard through the virtual keyboard image 111 and the hand image 113.

A part of the keyboard in which the user's fingers are positioned may be displayed as a focus-on image 117 such that the user can smoothly recognize the positions of the fingers. For example, if one of the user's fingers is positioned corresponding to "r" of the keyboard, "r" may be focused on and displayed as shown in FIG. 4.

Although FIG. 4 shows only a key corresponding to one finger, the positions of all of tens fingers may be focused on and displayed.

The controller 130 of the input device 10 can recognize the positions of fingers by performing image processing with respect to the user hand image 113 photographed through the infrared camera 120. In addition, the controller 130 may compare the finger positions with the position of the keyboard image 111 to recognize the finger positions on the keyboard image 111.

The controller 130 of the input device 10 may set points to the positions of the finger joints of the hand image 113, and recognize the motion of fingers according to the movement of each point.

The finger positions may be recognized through generally-know various image processing algorithms in addition to the above algorithm.

If a user makes a gesture to press a key button, key input may be performed. For example, as shown in FIG. 4, if the user bends one finger, the controller 130 recognizes the bending of the finger based on an image photographed by the camera 130. Accordingly, the controller 130 may perform key input corresponding to the position of the finger.

According to the above structure, the user can inputs keys while viewing the keyboard image 111 and the hand image 113, so that keyboard input can be performed without an additional remote controller or an additional wireless keyboard.

FIGS. 5 and 6 are views showing a method of performing mouse input by using the input device 10 according to one embodiment of the disclosure.

The user can execute a mouse input mode through voice input or a remote controller. If the mouse input mode is executed, a virtual mouse image 123 can be displayed on a screen as shown in FIG. 5. In addition, an indicator 125 may be displayed at one side of the screen to represent the mouse input mode.

If a user puts user's hands 121 into the detection region 115, a hand image 122 may be displayed on the screen as shown in FIG. 6. The user can correct the positions of the user's own hands 121 while viewing the virtual mouse image 123 and the hand image 122 of the user's own hands 121. The virtual mouse image 123 and the hand image 122 may be displayed as semi-transparent images.

If the user makes a gesture to grip the mouse image 123, the hand image 122 grips the mouse image 123. In this state, if the user moves the user's own hands 121, a pointer 124 moves.

If the user makes a gesture to click a right or left button of the mouse, the image in which the user's hand performs the right-click or left-click of the mouse is displayed, and the operation corresponding to the click is executed.

According to the embodiment, if the finger of the user is put on the left-button or the right-button of the mouse, the left-button or the right-button of the mouse may be focused on, enlarged, and displayed, or may be highlighted and displayed. In the state on which the mouse is focused on, if the user makes a gesture to click the mouse, the command corresponding to the click can be executed.

Similarly to the keyboard input mode, the controller 130 of the input device 10 compares the positions of the hand image 122 of the user and the mouse image 123 with each other to recognize the movement of the user hands 121. In addition, points are set on the joints of the user fingers, and the finger movement can be recognized according to the movement of the set points.

Although the keyboard input mode and the mouse input mode have been separately described according to the previous embodiment, an input mode, in which all of the virtual keyboard and mouse images are displayed, and the input operation through the keyboard and the mouse may simultaneously performed, may be provided FIGS. 7 and 8 show a method of inputting phone numbers using the gesture of the user according to one embodiment of the disclosure. Recently, displays such as smart TVs has been developed to support a voice call or a video call, and are applicable to the present embodiment.

The user can execute a phone mode through voice input. If the phone mode is executed, an input window 132 to display a key pad 131 and phone numbers, which has been input, may be displayed. All of the key pad 131 and the input window 132 can be displayed as semi-transparent images.

If the user puts fingers in the detection region of the camera 120 in this state, a finger image 134 can be displayed as shown in FIG. 8. If the user moves the position of the finger, the finger image 134 moves together with the user's finger. A key button corresponding to the position of a tip of the finger is focused on so that the position corresponding to the tip of the finger may be displayed. For example, if the position of the tip of the finger corresponds to "8" on the key pad 131, "8" may be focused on and displayed.

If the user makes a gesture to press the key pad 131, the button corresponding to the position of the finger can be input. The input value may be displayed on the input window 132. In this manner, the user can make a call or can perform other phone functions.

According to one embodiment of the disclosure, the recognition rate of user gestures can be improved by using a plurality of cameras 120.

Referring to FIG. 9, two cameras 120*a* and 120*b* may be installed at an upper portion or a predetermined position of the display 110. The cameras 120*a* and 120*b* may photograph user hands 114, and the photographed images are processed by the controller 130 so that the position of the hands 114 can be more exactly measured. If at least two cameras are used, the two cameras may serve as a stereo camera. Accordingly, a 3-D image can be extracted, and the movement of the fingers can be more exactly recognized. In addition, the movement in the vertical direction of the display 110, that is, the depth is more exactly measured, so that the gesture of the user can be more exactly recognized.

FIG. 10 is a flowchart showing the input method using the gestures according to one embodiment of the disclosure.

In step S11, the user can enter the gesture recognition mode through voice input, a remote controller, or other schemes. The gesture recognition mode may include a keyboard input mode, a mouse input mode, or a phone number input mode as described above.

If the gesture input mode is performed, the image of the input device to which the gestures are applied can be displayed in step S12. The image of the input device may include images of a keyboard, a mouse, or a phone number.

In step S13, if the user puts user's hands into the detection region, the image of the user's hands may be displayed. In step S14, if the user moves the hands, a key button corresponding to the position of a finger according to the movement of the hands is focused on and displayed, so that the position of the finger can be provided through a feedback scheme.

In step S15, if the user makes a gesture to press a key button or click a mouse, a command corresponding to the key button or the click of the mouse may be performed.

Although exemplary embodiments of the disclosure has been described for illustrative purposes, those skilled in the art will appreciate that various modifications, additions and substitutions are possible, without departing from the scope and spirit of the invention as disclosed in the accompanying claims.

The invention claimed is:

1. An input apparatus using a gesture comprising:
at least one camera photographing a gesture image of a user's hands introduced into a predetermined detection region near the input apparatus;
a controller displaying content, a virtual image of a device to which a gesture of the user is applied, and a user gesture image that has been photographed in a gesture recognition mode, and executing a command according to the gesture of the user;
a storage unit storing a command code used to run an operation of the controller;
a micro-phone receiving a voice of the user; and
a display outputting the images;
wherein, when a keyboard input mode is executed according to the voice received through the micro-phone, a keyboard input window is displayed, wherein a keyboard virtual image and input values are displayed on the keyboard input window;
wherein, in the keyboard mode, the controller is configured to:
recognize a finger position on the user gesture image based on a position of a user's finger in the detection region;
compare the finger position with a position of the keyboard virtual image to recognize the finger position on the keyboard virtual image;
display a feedback image corresponding to the finger position on the keyboard virtual image;
set points to positions of finger joints of the finger position;
detect a key input gesture position on the keyboard virtual image when a key input gesture is detected by recognizing a movement of each of the points; and
display a key image corresponding to the key input gesture position on the keyboard virtual image;
wherein the user's finger does not touch any real input device or the virtual image of the device;
wherein, when a mouse input mode is executed according to the voice received through the micro-phone, a virtual mouse image is displayed;
wherein, when the user makes a gesture to grip the virtual mouse image in the mouse mode, a hand image corresponding to the user's hand grips the virtual mouse image, and, in this state, when the user moves the user's hand, the virtual mouse image moves accordingly;

wherein, when a phone mode is executed according to the voice received through the micro-phone, an input window to display a key pad and phone numbers, which have been input, is displayed; and wherein all of the key pad and the input window are displayed as semi-transparent images.

2. The input apparatus of claim 1, wherein the controller activates or changes the gesture recognition mode according to the voice received through the micro-phone.

3. The input apparatus of claim 1, wherein the camera is an infrared camera or a visible light camera.

4. The input apparatus of claim 1, wherein the device to which the gesture of the user is applied includes at least one of a keyboard, a mouse, and a phone number key pad.

5. The input apparatus of claim 1, wherein the feedback image is a focus-on image corresponding to the finger position when the key input gesture is not yet detected.

6. The input apparatus of claim 1, wherein the feedback image comprises a plurality of focus-on images displaying a plurality of positions of a plurality of fingers.

7. The input apparatus of claim 1, wherein the at least one camera comprises a plurality of cameras installed at a predetermined position of a display.

8. The input apparatus of claim 1, wherein there is no real input device in the predetermined detection region, and
wherein the at least one camera comprises two cameras to serve as a stereo camera.

9. The input apparatus of claim 1, wherein, in the mouse input mode, when the user makes a gesture to click a right or left button of the mouse, the hand image in which the user's hand performs the right-click or left-click of the mouse is displayed, and the operation corresponding to the click is executed.

10. An input method using a gesture of a user, the input method comprising:

photographing a gesture of a user introduced into a predetermined detection region;

simultaneously displaying content and a virtual image of a device to which the gesture of the user is applied in a gesture recognition mode;

displaying a photographed image of the gesture of the user;

displaying a feedback image according to the gesture of the user;

displaying a key image according to the gesture of the user; and executing a command according to the gesture of the user;

wherein, when a keyboard input mode is executed according to a voice received through a micro-phone, a keyboard input window is displayed, wherein a keyboard virtual image and input values are displayed on the keyboard input window;

wherein, in the keyboard mode, displaying the feedback image comprises:

recognizing a finger position on the photographed image based on a position of a user's finger in the detection region;

comparing the finger position with a position of the keyboard virtual image to recognize the finger position on the keyboard virtual image;

displaying the feedback image corresponding to the finger position on the keyboard virtual image; and setting points to positions of finger joints of the finger position;

wherein displaying the key image comprises:

detecting a key input gesture position on the keyboard virtual image when a key input gesture is detected by recognizing a movement of each of the points; and displaying the key image corresponding to the key input gesture position on the keyboard virtual image;

wherein the user's finger does not touch any real input device or the virtual image of the device;

wherein, when a mouse input mode is executed according to the voice received through the micro-phone, a virtual mouse image is displayed;

wherein, when the user makes a gesture to grip the virtual mouse image in the mouse mode, a hand image corresponding to the user's hand grips the virtual mouse image, and, in this state, when the user moves the user's hand, the virtual mouse image moves accordingly;

wherein, when a phone mode is executed according to the voice received through the micro-phone, an input window to display a key pad and phone numbers, which have been input, is displayed; and wherein all of the key pad and the input window are displayed as semi-transparent images.

11. The input method of claim 10, wherein the device to which the gesture of the user is applied includes at least one of a keyboard, a mouse, and a phone number key pad.

12. The input method of claim 10, wherein the feedback image is a focus-on image corresponding to the finger position when the key input gesture is not yet detected.

13. The input method of claim 10, wherein the feedback image comprises a plurality of focus-on images displaying a plurality of positions of a plurality of fingers.

14. The input method of claim 10, wherein photographing the gesture of the user is performed by at least one camera.

15. The input method of claim 14, wherein the at least one camera comprises a plurality of cameras installed at a predetermined position of a display.

16. The input apparatus of claim 10, wherein there is no real input device in the predetermined detection region, and
wherein the at least one camera comprises two cameras to serve as a stereo camera.

17. The input method of claim 10, wherein, in the mouse input mode, when the user makes a gesture to click a right or left button of the mouse, the hand image in which the user's hand performs the right-click or left-click of the mouse is displayed, and the operation corresponding to the click is executed.

* * * * *